United States Patent [19]

Roy, III et al.

[11] Patent Number: 4,750,147

[45] Date of Patent: Jun. 7, 1988

[54] METHOD FOR ESTIMATING SIGNAL SOURCE LOCATIONS AND SIGNAL PARAMETERS USING AN ARRAY OF SIGNAL SENSOR PAIRS

[75] Inventors: Richard H. Roy, III, Cupertino; Arogyaswami J. Paulraj; Thomas Kailath, both of Stanford, all of Calif.

[73] Assignee: Stanford University, Stanford, Calif.

[21] Appl. No.: 795,623

[22] Filed: Nov. 6, 1985

[51] Int. Cl.$^4$ .............................................. G06G 7/48
[52] U.S. Cl. ................................... 364/807; 364/825; 364/801
[58] Field of Search .......................... 364/800, 807–808, 364/810, 825, 861, 801–806; 343/5 R, 5 AF, 6 R, 6.5 R, 6.5 LC, 6.5 SS, 450; 367/3–6, 12, 36–38, 43

[56] References Cited

PUBLICATIONS

J. P. Burg, "Maximum Entropy Spectral Analysis", *Proceedings of the 37th Meeting of the Society of Exploration Geophysicists*, Oklahoma City, OK 1967, (pp. 34–41).

J. Capon, "High-Resolution Frequency-Wavenumber Spectrum Analysis", *Proceedings of the IEEE*, vol. 57, No. 8, Aug. 1969, pp. 1408–1418.

V. F. Pisarenko, "The Retrieval of Harmonics From a Covariance Function", *Geophys. J. Royal Astronomical Society*, 1973, vol. 33, pp. 347–366.

R. Schmidt, "A Signal Subspace Approach to Multiple Emitter Location and Spectral Estimation", Ph.D. Dissertation, Stanford University, Nov. 1981.

*Primary Examiner*—Gary V. Harkcom
*Attorney, Agent, or Firm*—Flehr, Hohbach, Test, Albritton & Herbert

[57] ABSTRACT

The invention relates generally to the field of signal processing for signal reception and parameter estimation. The invention has many applications such as frequency estimation and filtering, and array data processing, etc. For convenience, only applications of this invention to sensor array processing are described herein. The array processing problem addressed is that of signal parameter and waveform estimation utilizing data collected by an array of sensors. Unique to this invention is that the sensor array geometry and individual sensor characteristics need not be known. Also, the invention provides substantial advantages in computations and storage over prior methods. However, the sensors must occur in pairs such that the paired elements are identical except for a displacement which is the same for all pairs. These element pairs define two subarrays which are identical except for a fixed known displacement. The signals must also have a particular structure which in direction-of-arrival estimation applications manifests itself in the requirement that the wavefronts impinging on the sensor array be planar. Once the number of signals and their parameters are estimated, the array configuration can be determined and the signals individually extracted. The invention is applicable in the context of array data processing to a number of areas including cellular mobile communications, space antennas, sonobuoys, towed arrays of acoustic sensors, and structural analysis.

3 Claims, 2 Drawing Sheets

FIG.—1

METHOD FOR ESTIMATING SIGNAL SOURCE LOCATIONS AND SIGNAL PARAMETERS USING AN ARRAY OF SIGNAL SENSOR PAIRS

The U.S. Government has rights in the described and claimed invention pursuant to Department of Navy Contract N00014-85-K-0550 and Department of Army Agreement No. DAAG29-85-K-0048.

BACKGROUND OF THE INVENTION

The invention described in this patent application relates to the problem of estimation of constant parameters of multiple signals received by an array of sensors in the presence of additive noise. There are many physical problems of this type including direction finding (DF) wherein the signal parameters of interest are the directions-of-arrival (DOA's) of wavefronts impinging on an antenna array (cf. FIG. 1), and harmonic analysis in which the parameters of interest are the temporal frequencies of sinusoids contained in a signal (waveform) which is known to be composed of a sum of multiple sinusoids and possibly additive measurement noise. In most situations, the signals are characterized by several unknown parameters all of which need to be estimated simultaneously (e.g., azimuthal angle, elevation angle and temporal frequency) and this leads to a multidimensional parameter estimation problem.

High resolution parameter estimation is important in many applications including electromagnetic and acoustic sensor systems (e.g., radar, sonar, electronic surveillance systems, and radio astronomy), vibration analysis, medical imaging, geophysics, well-logging, etc.. In such applications, accurate estimates of the parameters of interest are required with a minimum of computation and storage requirements. The value of any technique for obtaining parameter estimates is strongly dependent upon the accuracy of the estimates. The invention described herein yields accurate estimates while overcoming the practical difficulties encountered by present methods such as the need for detailed a priori knowledge of the sensor array geometry and element characteristics. The technique also yields a dramatic decrease in the computational and storage requirements.

The history of estimation of signal parameters can be traced back at least two centuries to Gaspard Riche, Baron de Prony, (R. Prony, Essai experimental et analytic, etc. L'Ecole Polytechnique, 1: 24–76, 1795) who was interested in fitting multiple sinuisoids (exponentials) to data. Interest in the problem increased rapidly after World War II due to its applications to the fast emerging technologies of radar, sonar and seismology. Over the years, numerous papers and books addressing this subject have been published, especially in the context of direction finding in passive sensor arrays.

One of the earliest approaches to the problem of direction finding is now commonly referred to as the conventional beamforming technique. It uses a type of matched filtering to generate spectral plots whose peaks provide the parameter estimates. In the presence of multiple sources, conventional beamforming can lead to signal suppression, poor resolution, and biased parameter (DOA) estimates.

The first high resolution method to improve upon conventional beamforming was presented by Burg (J. P. Burg, Maximum entropy spectral analysis, In *Proceedings of the 37th Annual International SEG Meeting*, Oklahoma City, OK., 1967). He proposed to extrapolate the array covariance function beyond the few measured bags, selecting that extrapolation for which the entropy of the signal is maximized. The Burg technique gives good resolution but suffers from parameter bias and the phenomenon referred to as line splitting wherein a single source manifests itself as a pair of closely spaced peaks in the spectrum. These problems are attributable to the mismodeling inherent in this method.

A different approach aimed at providing increased parameter resolution was introduced by Capon (J. Capon, High resolution frequency wave number spectrum analysis, *Proc. IEEE*, 57: 1408–1418, 1969). His approach was to find a weight vector for combining the outputs of all the sensor elements that minimizes output power for each look direction while maintaining a unit response to signals arriving from this direction. Capon's method has difficulty in multipath environments and offers only limited improvements in resolution.

A new genre of methods were introduced by Pisarenko (V. F. Pisarenko, The retrieval of harmonics from a covariance function, *Geophys. J. Royal Astronomical Soc.*, 33: 347–366, 1973) for a somewhat restricted formulation of the problem. These methods exploit the eigenstructure of the array covariance matrix. Schmidt made important generalizations of Pisarenko's ideas to arbitrary array/wavefront geometries and source correlations in his Ph.D. thesis titled *A Signal Subspace Approach to Multiple Emitter Location and Spectral Estimation*, Stanford University, 1981. Schmidt's MUltiple SIgnal Classification (MUSIC) algorithm correctly modeled the underlying problem and therefore generated superior estimates. In the ideal situation where measurement noise is absent (or equivalently when an infinite amount of measurements are available), MUSIC yields exact estimates of the parameters and also offers infinite resolution in that multiple signals can be resolved regardless of the proximity of the signal parameters. In the presence of noise and where only a finite number of measurements are available, MUSIC estimates are very nearly unbiased and efficient, and can resolve closely spaced signal parameters.

The MUSIC algorithm, often referred to as the eigenstructure approach, is currently the most promising high resolution parameter estimation method. However, MUSIC and the earlier methods of Burg and Capon which are applicable to arbitrary sensor array configurations suffer from certain shortcomings that have restricted their applicability in several problems. Some of these are:

Array Geometry and Calibration—A complete characterization of the array in terms of the sensor geometry and element characteristics is required. In practice, for complex arrays, this characterization is obtained by a series of experiments known as array calibration to determine the so called array manifold. The cost of array calibration can be quite high and the procedure is sometimes impractical. Also, the associated storage required for the array manifold is $2ml^g$ words (m is the number of sensors, l is the number of search (grid) points in each dimension, and g is the number of dimensions) and can become large even for simple applications. For example, a sensor array containing 20 elements, searching over a hemisphere with a 1 millirad resolution in azimuth and elevation and using 16 bit words (2 bytes each) requires approximately 100 megabytes of storage! This number increases exponentially as another search dimension such as temporal frequency is included. Furthermore, in certain applications the array geometry may be slowly changing such as in light weight spaceborne antenna structures, sonobuoy and towed arrays used in sonar etc., and a complete characterization of the array is never available.

Computational Load—In the prior methods of Burg, Capon, Schmidt and others, the main computational burden lies in generating a spectral plot whose peaks correspond to the parameter estimates. For example, the number of operations required in the MUSIC algorithm in order to compute the entire spectrum, is approximately $4m^2lg$. An operation is herein considered to be a floating point multiplication and an addition. In the example above, the number of operations needed is approximately $4 \times 10^9$ which is prohibitive for most applications. A powerful 10 MIP (10 million floating point instructions per second) machine requires about 7 minutes to perform these computations! Moreover, the computation requirement grows exponentially with dimension of the parameter vector. Augmenting the dimension of the parameter vector further would make such problems completely intractable.

The technique described herein is hereafter referred to as Estimation of Signal Parameters using Rotational Invariance Techniques (ESPRIT). ESPRIT obviates the need for array calibration and dramatically reduces the computational requirements of previous approaches. Furthermore, since the array manifold is not required, the storage requirements are eliminated altogether.

SUMMARY OF THE INVENTION

ESPRIT is an alternative method for signal reception and source parameter estimation which possesses most of the desirable features of prior high resolution techniques while realizing substantial reduction in computation and elimination of storage requirements. The basic properties of the invention may be summarized as follows:

1. ESPRIT details a new method of signal reception for source parameter estimation for planar wavefronts.
2. The method yields signal parameter estimates without requiring knowledge of the array geometry and sensor element characteristics, thus eliminating the need for sensor array calibration.
3. ESPRIT provides substantial reduction in computation and elimination of storage requirements over prior techniques. Referring to the previous example, ESPRIT requires only $4 \times 10^4$ computations compared to $4 \times 10^9$ computations required by prior methods, and reduces the time required from 7 minutes to under 4 milliseconds. Furthermore, the 100 megabytes of storage required is completely eliminated.
4. A feature of the invention is the use of an array of sensor pairs where the sensors in each pair are identical and groups of pairs have a common displacement vector.

Briefly, in accordance with the invention, an array of signal sensor pairs is provided in which groups of sensor pairs have a uniform relative vector displacement within each group, but the displacement vector for each group is unique. The sensors in each pair must be matched, however they can differ from other sensor pairs. Moreover, the characteristics of each sensor and the array geometry can be arbitrary and need not to be known. Within each group, the sensor pairs can be arranged into two subarrays, X and Y, which are identical except for a fixed displacement (cf. FIG. 2). For example, in order to simultaneously perform temporal frequency and spatial angle estimation, one group of sensor pairs would share a common spatial displacement vector while the second group would share a common temporal displacement. In general, for each additional type of parameter to be estimated, a sensor group sharing a common displacement is provided. Furthermore, the number of sensor pairs in each group must be more than the number of sources whose parameters are to be estimated.

Having provided an array of sensors which meets the specifications outlined above, signals from this array of sensor pairs are then processed in order to obtain the parameter estimates of interest. The procedure for obtaining the parameter estimates may be outlined as follows:

1. Using the array measurements from a group of sensor pairs, determine the auto-covariance matrix $R_{xx}$ of the X subarray in the group and the cross-covariance matrix $R_{xy}$ between the X and Y subarrays in the group.
2. Determine the smallest eigenvalue of the covariance matrix $R_{xx}$ and then subtract it out from each of the elements on the principal diagonal of $R_{xx}$. The results of the subtraction are referred to hereinafter as $C_{xx}$.
3. Next, the generalized eigenvalues (GE's) $\gamma_i$ of the matrix pair $(C_{xx}, R_{xy})$ are determined. A number $d$ of the GE's will lie on or near the unit circle and the remaining $m-d$ noise GE's will lie at or near the origin. The number of GE's on or near the unit circle determine the number of sources, and their angles are the phase differences sensed by the sensor doublets in the group for each of the wavefronts impinging on the array. These phase differences are directly related to the directions of arrival.
4. The procedure is then repeated for each of the groups, thereby obtaining the estimates for all the parameters of interest (e.g., azimuth, elevation, temporal frequency).

Thus, the number of sources and the parameters of each source are the primary quantities determined. ESPRIT can be further extended to the problem of determining the array geometry a posteriori, i.e., obtaining estimates of the sensor locations given the measurements. Source powers and optimum weight vectors for solving the signal copy problem, a problem involving estimation of the signal received from one of the sources at a time eliminating all others, can also be estimated in a straightforward manner as follows:

1. The optimum weight vector for signal copy for the $i^{th}$ signal is the generalized eigenvector (GV) $e_i$ corresponding to the $i^{th}$ GE $\gamma_i$.
2. For the case when the sources are uncorrelated, the direction vector $a_i$ for the $i^{th}$ wavefront is given by $R_{xy}e_i$. With these direction vectors in hand, the array geometry can be estimated by solving a set of linear equations.
3. Using the direction vectors $a_i$, the signal powers can also be estimated by solving a set of linear equations.

The invention and objects and features thereof will be more readily apparent from the following example and appended claims.

DETAILED DESCRIPTION OF THE DRAWINGS

Figure 1:
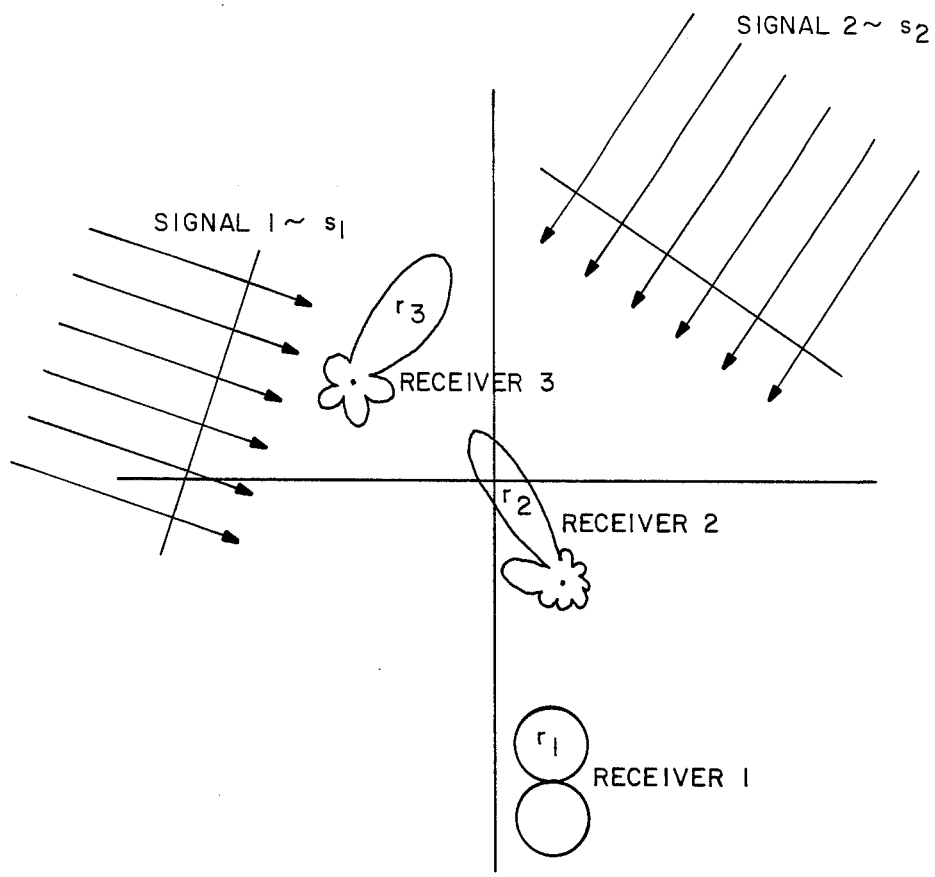
FIG. 1 is a graphic representation of a problem of direction-of-arrival estimation in which two sources are present and being monitored by a three-element array of sensors.

As indicated above, the invention is directed at the estimation of constant parameters of signals received by an array of sensor pairs in the presence of noise. The problem can be visualized with reference to FIG. 1 in which two signals ($s_1$ and $s_2$) are impinging on an array of three sensors ($r_1$, $r_2$, $r_3$). It is assumed in this illustrated example that the sources and sensors lie in a plane; thus only two parameters need be identified, the azimuth angle of the two signals. Heretofore, techniques such as MUSIC have been able to accurately estimate the DOA's of the two signals; however the characteristics of each sensor must be known as well as the overall array geometry. This leads to exceedingly large storage requirements when the array must be calibrated, and a correspondingly large computation time in the execution of the algorithms.

Figure 2:
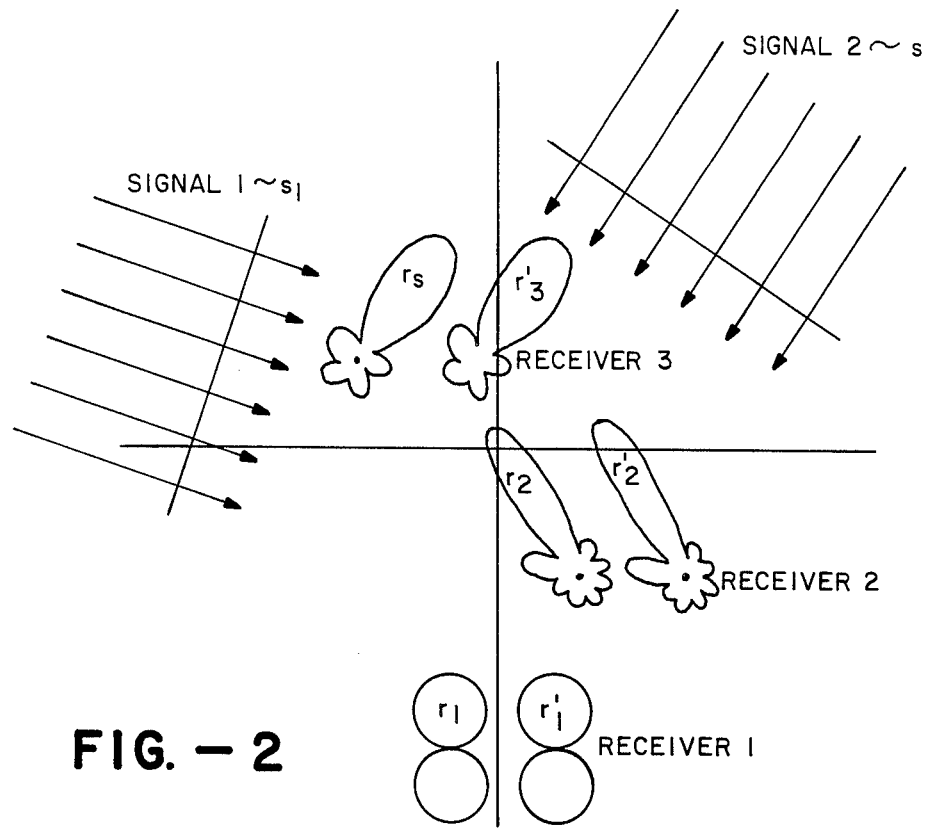
FIG. 2 is a graphic representation of a similar problem in which the two signals are now impinging on an array of sensors pairs in accordance with the invention.

In accordance with the present invention, array (manifold) calibration is not required in ESPRIT as long as the array is comprised of (groups of) matched sensor pairs sharing a common displacement vector. This is illustrated in FIG. 2 in which the two signals ($s_1$ and $s_2$) are sensed by receiver pairs ($r_1$, $r'_1$; $r_2$, $r'_2$; and $r_3$, $r'_3$). The only requirements of the array are that the sensor pairs are offset by the same vector as indicated, and that the number of sensor pairs exceeds the number of sources as is the case in this example.

Figure 3:
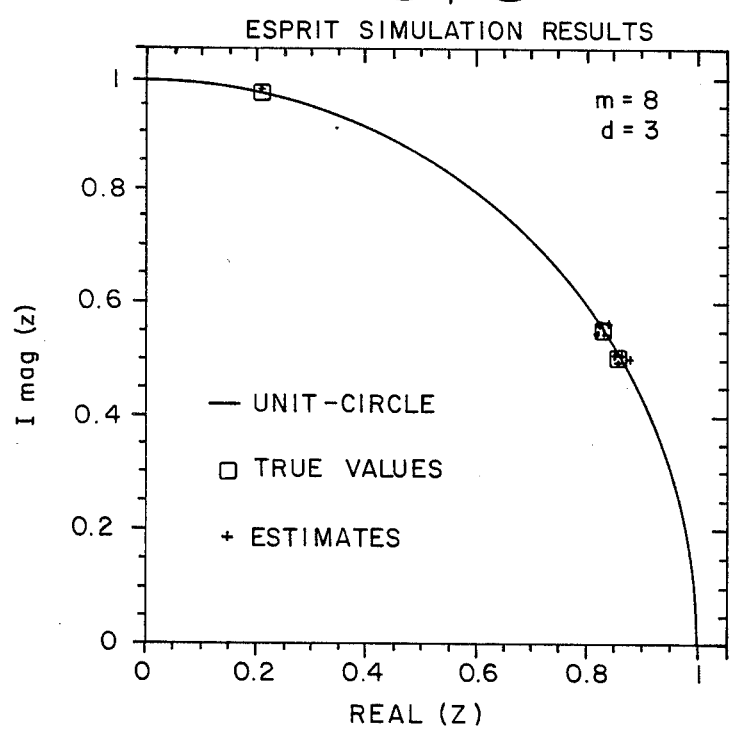
FIG. 3 is a graphic illustration of the parameter estimates from a simulation performed in accordance with the invention in which three signals were impinging on an array of eight sensor doublets and directions-of-arrival were being estimated.

The performance of the invention is graphically illustrated in FIG. 3 which presents the results of a simulation performed according to the specifications of ESPRIT. The simulation consisted of an array with 8 doublets. The elements in each of the doublets were spaced a quarter of a wavelength apart. The array geometry was generated by randomly scattering the doublets on a line 10 wavelengths in length such that the doublet axes were all parallel to the line. Three planar and weakly correlated signal wavefronts impinged on the array at angles 20°, 22°, and 60°, with SNRs of 10, 13 and 16 db relative to the additive uncorrelated noise present at the sensors. The covariance estimates were computed from 100 snapshots of data and several simulations runs were made using independent data sets.

FIG. 3 shows a plot of the GE's obtained from 10 independent trials. The three small circles on the unit circle indicate the locations of the true parameters and the pluses are the estimates obtained using ESPRIT. The GE's on the unit circle are closely clustered and the two sources 2° apart are easily resolved.

As illustrated, accurate estimates of the DOA's are obtained. Furthermore, ESPRIT has several additional features which are enumerated below.

1. ESPRIT appears to be very robust to errors in estimating the minimum eigenvalue of the covariance $R_{xx}$. It is also robust to the numerical properties of the algorithm used to estimate the generalized eigenvalues.

2. ESPRIT does not require the estimation of the number of sources prior to source parameter estimation as in the MUSIC algorithm, where an error in the estimate of the number of sources can invalidate the parameter estimates. In accordance with the invention, ESPRIT simultaneously estimates the signal parameters and the number of sources.

APPLICATIONS

There are a number of applications that exploit one or more of the important features of ESPRIT, i.e., its insensitivity to array geometry, low computational load and no storage requirements. Some of these are described below.

1. Direction-of-Arrival Estimation (a) Space Antennas—Space structures are necessarily light weight, very large and therefore fairly flexible. Small disturbances can cause the structure to oscillate for long periods of time resulting in a sensor array geometry which is time-varying. Furthermore, it is nearly impossible to completely calibrate such an array as the setting up of a suitable facility is not practical. On the other hand, the use of matched pairs of sensor doublets whose directions are constantly aligned by a low-cost star-tracking servo results in total insensitivity to the global geometry of the array. Note that signal copy can still be performed, a function which is often a main objective of such large spaceborne antenna arrays. In fact, a connected structure for the array is not required! Rather, only a collection of relatively small antenna doublets is needed, each possessing a star-tracker or earth-based beacon tracker for alignment. Ease of deployment, maintenance, and repair of such disconnected arrays can have significant cost and operational benefits (for example, a defective unit can be merely transported to a space station or back to the earth for repair).

(b) Sonobuoys—Sonobuoys are air-dropped and scatter somewhat randomly on the ocean surface. The current methods of source location require complete knowledge of the three dimensional geometry of the deployed array. The determination of the array geometry is both expensive and undesirable (since it involves active transmission thus alerting unfriendly elements!). Using ESPRIT, vertical alignment of doublets can be achieved using gravity as a reference. Horizontal alignment can be obtained via a small servo and a miniature magnetic sensor (or even use an acoustic spectral line radiated from a beacon or the target itself). Within a few minutes after the sonobuoys are dropped, alignment can be completed and accurate estimates of DOA's become available. As before, signal copy processing is also feasible. Furthermore, the sonobuoy array geometry can itself be determined should this be of interest.

(c) Towed Arrays—These consist of a set of hydrophones placed inside a acoustically transparent tube that is towed well behind a ship or submarine. The common problem with towed arrays is that the tube often distorts from the assumed straight line geometry due to ocean and tow-ship induced disturbances. Therefore, prior array calibration becomes invalid. In the new approach, any translational disturbance in the doublets is of no consequence. Therefore by selective use of doublets (whose orientation can be easily sensed) that are acceptably co-directional, reliable source DOA estimates can still be obtained.

(d) Mobile DF and Signal Copy Applications—Often, mobile (aircraft, van mounted) direction finding (DF) systems cannot meet the vast storage and computational requirements of the prior methods. ESPRIT can drastically reduce such requirements and still provide good performance. This has particular applicability in the field of cellular mobile communications where the number of simultaneous users is limited due to finite bandwidth constraints and cross-talk (interchannel interference). Current techniques for increasing the number of simultaneous users exploit methods of signal separation such as frequency, time and code division multiplexing apart from the area multiplexing inherent to the cellular concept. Using directional discrimination (angle division multiplexing), the number of simultaneous users could be increased significantly. ESPRIT provides a simple and relatively low cost technique for performing the signal copy operation through angular signal separation. The estimation (possibly recursively) of the appropriate generalized eigenvector is all that is needed in contrast to substantially more complex procedures required by prior methods.

2. Temporal Frequency Estimation—There are many applications in radio astronomy, modal identification of linear systems including structural analysis, geophysics sonar, electronic surveillance systems, analytical chemistry etc., where a composite signal containing multiple harmonics is present in additive noise. ESPRIT provides frequency estimates from suitably sampled time series at a substantially reduced level of computation over the previous methods.

3. Joint DOA-Frequency Estimation—Applications such as radio astonomy may require the estimation of declination and right ascension of radio sources along with the frequency of the molecular spectral lines emitted by them. Such problems also arise in passive sonar and electronic surveillance applications. As previously noted, ESPRIT has particularly important advantages in such multi-dimensional estimation problems.

Having concluded the summary of the invention and applications, a detailed mathematical description of the invention is presented.

PROBLEM FORMULATION

The basic problem under consideration is that of estimation of parameters of finite dimensional signal processes given measurements from an array of sensors. This general problem appears in many different fields including radio astronomy, geophysics, sonor signal processing, electronic surveillance, structural (vibration) analysis, temporal frequency estimation, etc. In order to simplify the description of the basic ideas behind ESPRIT, the ensuing discussion is couched in terms of the problem of multiple source direction-of-arrival (DOA) estimation from data collected by an array of sensors. Though easily generalized to higher dimensional parameter spaces, the discussion and results presented deal only with single dimensional parameter spaces, i.e., azimuth only direction finding (DF) of farfield point sources. Furthermore, narrowband signals of known center frequency will be assumed. A DOA/DF problem is classified as narrowband width is small compared to the inverse of the transit time of a wavefront across the array. The generality of the fundamental concepts on which ESPRIT is based makes the extension to signals containing multiple frequencies straightforward as discussed later. Note that wideband signals can also be handled by decomposing them into narrowband signal sets using comb filters.

Consider a planar array of arbitrary geometry composed of $m$ matched sensor doublets whose elements are translationally separated by a known constant displacement vector as shown in FIG. 2. The element characteristics such as element gain and phase pattern, polarization sensitivity, etc., may be arbitrary for each doublet as long as the elements are pairwise identical. Assume there are $d < m$ narrowband stationary zero-mean sources centered at frequency $\omega_0$, and located sufficiently far from the array such that in homogenous isotropic transmission media, the wavefronts impinging on the array are planar. Additive noise is present at all the $2m$ sensors and is assumed to be a stationary zero-mean random process that is uncorrelated from sensor to sensor.

In order to exploit the translational invariance property of the sensor array, it is convenient to describe the array as being comprised of two subarrays, X and Y, identical in every respect although physically displaced (not rotated) from each other by a known displacement vector. The signals received at the $i^{th}$ doublet can then be expressed as:

$$x_i(t) = \sum_{k=1}^{d} s_k(t) a_i(\theta_k) + n_{xi}(t) \quad (1)$$

$$y_i(t) = \sum_{k=1}^{d} s_k(t) e^{j\omega_0 \Delta \sin\theta_k/c} a_i(\theta_k) + n_{yi}(t)$$

where $s_k(\cdot)$ is the $k^{th}$ signal (wavefront) as received at sensor 1 (the reference sensor) of the X subarray, $\theta_k$ is the direction of arrival of the $k^{th}$ source relative to the direction of the translational displacement vector, $a_i(\theta_k)$ is the response of the $i^{th}$ sensor of either subarray relative to its response at sensor 1 of the same subarray when a single wavefront impinges at an angle $\theta_k$, $\Delta$ is the magnitude of the displacement vector between the two arrays, $c$ is the speed of propagation in the transmission medium, $n_{xi}(\cdot)$ and $n_{yi}(\cdot)$ are the additive noises at the elements in the $i^{th}$ doublet for subarrays X and Y respectively.

Combining the outputs of each of the sensors in the two subarrays, the received data vectors can be written as follows:

$$x(t) = As(t) + n_x(t),$$

$$y(t) = A\Phi s(t) + n_y(t); \quad (2)$$

where:

$$x^T(t) = [x_1(t) \ldots x_m(t)],$$

$$n_x^T(t) = [n_{x1}(t) \ldots n_{xm}(t)],$$

$$y^T(t) = [y_1(t) \ldots y_m(t)],$$

$$n_y^T(t) = [n_{y1}(t) \ldots n_{ym}(t)], \quad (3)$$

The vector $s(t)$ is a $d \times 1$ vector of impinging signals (wavefronts) as observed at the reference sensor of subarray X. The matrix $\Phi$ is a diagonal $d \times d$ matrix of the phase delays between the doublet sensors for the $d$ wavefronts, and can be written as:

$$\Phi = \text{diag}[e^{j\omega_0 \Delta \sin\theta_1/c}, \ldots, e^{j\omega_0 \Delta \sin\theta_d/c}]. \quad (4)$$

Note that $\Phi$ is a unitary matrix (operator) that relates the measurements from subarray X to those from subarray Y. In the complex field, $\Phi$ is a simple scaling operator. However, it is isomorphic to the real two-dimensional rotation operator and is herein referred to as a rotation operator. The $m \times d$ matrix A is the direction matrix whose columns $\{a(\theta_k), k=1, \ldots, d\}$ are the signal direction vectors for the $d$ wavefronts.

$$a^T(\theta_k) = [a_1(\theta_k), \ldots, a_m(\theta_k)]. \tag{5}$$

The auto-covariance of the data received by subarray X is given by:

$$R_{xx} = E[x(t)x^*(t)] = ASA^* + \sigma^2 I, \tag{6}$$

where S is the $d \times d$ covariance matrix of the signals $s(t)$, i.e., $$S = E[s(t)s(t)^*], \tag{7}$$

and $\sigma^2$ is the covariance of the additive uncorrelated white noise that is present at all sensors. Note that $(\cdot)^*$ is used herein to denote the Hermitean conjugate, or complex conjugate transpose operation. Similarly, the cross-covariance between measurements from subarrays X and Y is given by:

$$R_{xy} = E[x(t)y(t)^*] = AS\Phi^*A^*. \tag{8}$$

This completes the definition of the signal and noise model, and the problem can now be stated as follows:

Given measurements $x(t)$ and $y(t)$, and making no assumptions about the array geometry, element characteristics, DOA's, noise powers, or the signal (wavefront) correlation, estimate the signal DOA's.

ROTATIONALLY INVARIANT SUBSPACE APPROACH

The basic idea behind the new technique is to exploit the rotational invariance of the underlying signal subspaces induced by the translational invariance of the sensor array. The following theorem provides the foundation for the results presented herein.

Theorem: Define $\Gamma$ as the generalized eigenvalue matrix associated with the matrix pencil $\{(R_{xx} - \lambda_{min}I), R_{xy}\}$ where $\lambda_{min}$ is the minimum (repeated) eigenvalue of $R_{xx}$. Then, if S is nonsingular, the matrices $\Phi$ and $\Gamma$ are related by $$\Gamma = \begin{bmatrix} \Phi & 0 \\ 0 & 0 \end{bmatrix} \tag{9}$$

to within a permutation of the elements of $\Phi$.

Proof: First it is shown that $ASA^*$ is rank $d$ and $R_{xx}$ has a multiplicity $(m-d)$ of eigenvalues all equal to $\sigma^2$. From linear algebra, $$\rho(ASA^*) = \min(\rho(A), \rho(S)) \tag{10}$$

where $\rho(\cdot)$ denotes the rank of the matrix argument. Assuming that the array geometry is such that there are no ambiguities (at least over the angular interval where signals are expected), the columns of the $m \times d$ matrix A are linearly independent and hence $\rho(A) = d$. Also, since S is a $d \times d$ matrix and is nonsingular, $\rho(S) = d$. Therefore, $\rho(ASA^*) = d$, and consequently $ASA^*$ will have $m-d$ zero eigenvalues. Equivalently $ASA^* + \sigma^2 I$ will have $m-d$ minimum eigenvalues all equal to $\sigma^2$. If $\{\lambda_1 > \lambda_2 > \ldots > \lambda_m\}$ are the ordered eigenvalues of $R_{xx}$, then $$\lambda_{d+1} = \ldots = \lambda_m = \sigma^2. \tag{11}$$

Hence, $$R_{xx} - \lambda_{min}I = R_{xx} - \sigma^2 I = ASA^*. \tag{12}$$

Now consider the matrix pencil $$C_{xx} - \gamma R_{xy} = ASA^* - \gamma AS\Phi^*A^* = AS(I - \gamma\Phi^*)A^*; \tag{13}$$

where $C_{xx} \doteq R_{xx} - \lambda_{min}{}^{xx}I$. By inspection, the column space of both $ASA^*$ and $AS\Phi^*A^*$ are identical. Therefore, $\rho(ASA^* - \gamma AS\Phi^*A^*)$ will in general be equal to $d$. However, if $$\gamma = e^{j\omega_0 \Delta \sin \theta_i/e}, \tag{14}$$

the $i^{th}$ row of $(I - e^{j\omega_0 \Delta \sin \theta_i/e}\Phi)$ will become zero. Thus, $$\rho(I - e^{j\omega_0 \Delta \sin \theta_i/e}\Phi) = d - 1. \tag{15}$$

Consequently, the pencil $(C_{xx} - \gamma R_{xy})$ will also decrease in rank to $d-1$ whenever $\gamma$ assumes values given by (14). However, by definition these are exactly the generalized eigenvalues (GEV's) of the matrix pair $\{C_{xx}, R_{xy}\}$. Also, since both matrices in the pair span the same subspace, the GEV's corresponding to the common null space of the two matrices will be zero, i.e., $d$ GEV's lie on the unit circle and are equal to the diagonal elements of the rotation matrix $\Phi$, and the remaining $m-d$ (equal to the dimension of the common null space) GEV's are at the origin. This completes the proof of the theorem.

Once $\Phi$ is known, the DOA's can be calculated from:

$$\theta_k = \arcsin \{c\Phi_{kk}/\omega_0 \Delta\}. \tag{16}$$

Due to errors in estimating $R_{xx}$ and $R_{xy}$ from finite data as well as errors introduced during the subsequent finite precision computations, the relations in (9) and (11) will not be exactly satisfied. At this point, a procedure is proposed which is not globally optimal, but utilizes some well established, stepwise-optimal techniques to deal with such issues.

Subspace Rotation Algorithm (ESPRIT)

The key steps of the algorithm are:
1. Find the auto- and cross-covariance matrix estimates $\hat{R}_{xx}$ and $\hat{R}_{xy}$ from the data.
2. Compute the eigen-decomposition of $\hat{R}_{xx}$ and $\hat{R}_{xy}$ and then estimate the number of sources $\hat{d}$ and the noise variance $\hat{\sigma}^2$.
3. Compute rank $\hat{d}$ approximations to $ASA^*$ and $AS\Phi^*A^*$ given $\hat{\sigma}^2$.
4. The $\hat{d}$ GEV's of the estimates of $ASA^*$ and $AS\Phi^*A^*$ that lie close to the unit circle determine the subspace rotation operator $\Phi$ and hence, the DOA's.

Details of the algorithm are now discussed.
Covariance Estimation

In order to estimate the required covariances, observations $x(t_j)$ and $y(t_j)$ at time intervals $t_j$ are required. Note that the subarrays must be sampled simultaneously. The maximum likelihood estimates (assuming no underlying data model) of the auto- and cross-covariance matrices are then given by $$\hat{R}_{xx} = \frac{1}{N} \sum_{j=1}^{N} x(t_j)x(t_j)^* \qquad (17)$$

$$\hat{R}_{xy} = \frac{1}{N} \sum_{j=1}^{N} x(t_j)y(t_j)^*.$$

The number of snapshots, N, needed for an adequate estimate of the covariance matrices depends upon the signal-to-noise ratio at the array input and the desired accuracy of the DOA estimates. In the absence of noise, $N > d$ is required in order to completely span the signal subspaces. In the presence of noise, it has been shown that N must be at least $m^2$. Typically, if the SNR is known, N is chosen such that the Frobenius norm of the perturbations in $\hat{R}$ is 30 db below the covariance matrix norm.

Estimating $d$ and $\sigma^2$

Due to errors in $\hat{R}_{xx}$, its eigenvalues will be perturbed from their true values and the true multiplicity of the minimal eigenvalue may not be evident. A popular approach for determining the underlying eigenvalue multiplicity is an information theoretic method based on the minimum description length (MDL) criterion. The estimate of the number of sources $d$ is given by the value of $k$ for which the following MDL function is minimized:

$$MDL(k) = -\log \left\{ \frac{\prod_{i=k+1}^{m} \hat{\lambda}_i^{\frac{1}{m-k}}}{\frac{1}{m-k} \sum_{i=k+1}^{m} \hat{\lambda}_i} \right\}^{(m-k)N} + \qquad (18)$$

$$\frac{k}{2}(2m - k)\log N;$$

where $\hat{\lambda}_i$ are the eigenvalues of $R_{xx}$. The MDL criterion is known to yield asymptotically consistent estimates. Note that since $R_{xx}$ and $R_{xy}$ both span the same subspace (of dimension $d$), a method that efficiently exploits this underlying model will yield better results.

Having obtained an estimate of $d$, the maximum likelihood estimate of $\sigma^2$ conditioned on $\hat{d}$ is given by the average of the smallest $m - \hat{d}$ eigenvalues i.e., $$\hat{\sigma}^2 = \frac{1}{m-\hat{d}} \sum_{i=\hat{d}+1}^{m} \hat{\lambda}_i. \qquad (19)$$

Estimating ASA* and AS$\Phi$*A*

Using the results from the previous step, and making no assumptions about the array geometry, the maximum likelihood estimate $\hat{C}_{xx}$ of ASA*, conditioned on $\hat{d}$ and $\hat{\sigma}^2$, is the maximum Frobenius norm (F-norm) rank $d$ approximation of $\hat{R}_{xx} - \hat{\sigma}^2 I$, i.e., $$\hat{C}_{xx} = \sum_{i=1}^{d} (\hat{\lambda}_i - \hat{\sigma}^2) \hat{e}_i \hat{e}_i^*; \qquad (20)$$

where; $\{e_1, e_2, \ldots e_m\}$ are the eigenvectors corresponding to the ordered eigenvalues of $\hat{R}_{xx}$.

Similarly, given $\hat{R}_{xy}$ and $\hat{d}$, the maximum likelihood estimate AS$\Phi$*A* is the maximum F-norm rank $d$ approximation of $\hat{R}_{xy}$ $$AS\Phi^* A^* = \sum_{i=1}^{d} \hat{\lambda}_i^{xy} e_i^{xy} e_i^{xy*}; \qquad (21)$$

where, $\{\hat{\lambda}_1^{xy} > \hat{\lambda}_2^{xy} > \ldots > \hat{\lambda}_m^{xy}\}$ and $\{e_1^{xy}, e_2^{xy}, \ldots, e_m^{xy}\}$ are the eigenvalues and the corresponding eigenvectors of $\hat{R}_{xy}$.

As remarked earlier, the information in $\hat{R}_{xx}$ and $\hat{R}_{xy}$ can be jointly exploited to improve the estimates of the underlying subspace and therefore of the estimates of ASA* and AS$\Phi$*A*. In situations where the array geometry (i.e., the manifold on which the columns of A lie) is known, these estimates can be further improved, but this is not pursued here since no knowledge of the array geometry is assumed.

Estimating Directions of Arrival

The estimates of the DOA's now follow by computing the the $m$ GEV's of the matrix pair ASA* and AS$\Phi$*A*. This is a singular generalized eigen-problem and needs more care than the regular case to obtain stable estimates of the GEV's. Note that since the subspaces spanned by the two matrix estimates cannot be expected to be identical, the $m-d$ noise GEV's will not be zero. Furthermore, the signal GEV's will not lie exactly on the unit circle. In practice, $d$ GEV's will lie close to the unit circle and the remaining $m-d$ GEV's well inside and close to the origin. The $d$ values near the unit circle are the desired estimates of $\Phi_{kk}$. The argument of $\Phi_{kk}$ may now be used in conjunction with (16) to obtain estimates of the source directions. This concludes the detailed discussion of the algorithm.

Some Results

Estimation of the Number of Signals

In the algorithm detailed above, an estimate of the number of sources $\hat{d}$ is obtained as one of the first steps in the algorithm. This estimate is then used in subsequent steps as the rank of the approximations to covariance matrices. This approach has the disadvantage that an error (particularly underestimation) in determining $d$ may result in severe biases in the final DOA estimates. Therefore, if an estimator for $\sigma^2$ can be found which is independent of $d$ (e.g., $\hat{\sigma}^2 = \hat{\lambda}_{min}$), estimation of $d$ and the DOA's can be performed simultaneously. Simulation results have shown that the estimates of $\Phi$ have low sensitivity to errors in estimating $\sigma^2$. This implies that the rank $d$ estimates of ASA* and AS$\Phi$*A* can be dispensed with and the GEV's computed directly from the matrix pair $\{\hat{R}_{xx} - \hat{\sigma}^2 I, \hat{R}_{xy}\}$. This results in the need to classify the GEV's as either source or noise related which is a function of their proximity to the unit circle. This ability to simultaneously estimate $d$ and the parameters of interest is another advantage of ESPRIT over MUSIC.

Extensions to Multiple Dimensions

The discussion hitherto has considered only single dimensional parameter estimation. Often, the signal parameterization is of higher dimension as in DF problems where azimuth, elevation, and temporal frequency must be estimated. In essence, to extend ESPRIT to estimate multidimensional parameter vectors, measurements must be made by arrays manifesting the the shift invariant structure in the appropriate dimension. For example, co-directional sensor doublets are used to estimate DOA's in a plane (e.g., azimuth) containing the doublet axes. Elevation angle is unobservable with such an array as a direct consequence of the rotational symmetry about the reference direction defined by the doublet axes (cf. cones of ambiguity). If both azimuth and elevation estimates are required, another pair of subarrays (preferably orthogonal to the first pair) sensitive to elevation angle is necessary. Geometrically, this provides an independent set of cones, and the intersections of the two sets of cones yield the desired estimates. Note that the parameter estimates (e.g., azimuth and elevation) can be calculated independently. This results in the computational load in ESPRIT growing linearly with the dimension of the signal parameter vector, whereas in MUSIC it increases exponentially.

If the signals impinging on the array are not monochromatic, but are composed of sums of cisoids of fixed frequencies, ESPRIT can also estimate the frequencies. This requires temporal (doublet) samples which can be obtained for example by adding a uniform tapped delay line ($p+1$ taps) behind each sensor. The frequencies estimates are obtained (independent of the DOA estimates) from the $mp \times mp$ auto- and cross-covariance matrices of two (temporally) displaced data sets (corresponding to subarrays in the spatial domain). The first set X contains $mp$ samples obtained from taps 1 to $p$ taps in each of the $m$ delay lines behind the sensors. The set Y is a delayed version of X and uses taps 2 to $p+1$ in each of the $m$ delay lines. The GE's obtained from these data sets define the multiple frequencies. Note that in time domain spectral estimation, ESPRIT is only applicable for estimating parameters of sums of (complex) exponentials. As mentioned previously, wideband signals can be handled by processing selected frequency components obtained via frequency selective narrowband (comb) filters.

Array Ambiguities

Array ambiguities are discussed below in the context of DOA estimation, but can be extended to other problems as well.

Ambiguities in ESPRIT arise from two sources. First, ESPRIT inherits the ambiguity structure of a single doublet, independent of the global geometry of the array. Any distribution of co-directional doublets contains a symmetry axis, the doublet axis. Even though the individual sensor elements may have directivity patterns which are functions of the angle in the other dimension (e.g., elevation), for a given elevation angle the directional response of each element in any doublet is the same, and the phase difference observed between the elements of any doublet depends only on the azimuthal DOA. The MUSIC algorithm, on the other hand, can (generally) determine azimuth and elevation without ambiguity given this geometry since knowledge of the directional sensitivities of the individual sensor elements is assumed.

Other doublet related ambiguities can also arise if the sensor spacing within the doublets is larger than $\lambda/2$. In this case, ambiguities are generated at angles arcsin $\{\lambda(\Phi_{ii} \pm 2n\pi)/2\pi\Delta\}$, $n=0, 1, \ldots$, a manifestation of undersampling and the aliasing phenomenon.

ESPRIT is also heir to the subarray ambiguities usually classified in terms of first-order, second-order, and higher order ambiguities of the array manifold. For example, second-order, or rank 2 ambiguities occur when a linear combination of two elements from the array manifold also lies on the manifold, resulting in an inability to distinguish between the response due to two sources and a third source whose array response is a weighted sum of the responses of the first two. These ambiguities manifest themselves in the same manner as in MUSIC where they bring about a collapse of the signal subspace dimensionality.

Finally, it should be noted that the doublet related ambiguities present in ESPRIT do not cause any real difficulties in practice. Indeed, it is precisely such ambiguities that allow ESPRIT to separately solve the problem in each dimension.

Array Response Estimation and Signal Copy

There are parameters other than DOA's and temporal frequencies that are often of interest in array processing problems. Extensions of ESPRIT to provide such estimates are described below. ESPRIT can also be easily extended to solve the signal copy problem, a problem which is of particular interest in communications applications.

Estimation of Array Response (Direction) Vectors

Let $e_i$ be the generalized eigenvector (GEV) corresponding to the generalized eigenvalue (GE) $\gamma_i$. By definition, $e_i$ satisfies the relation $$AS(I-\gamma_i\Phi)A^*e_i=0. \quad (22)$$

Since the column space of the pencil $AS(I-\gamma_i\Phi)A^*$ is the same as the subspace spanned by the vectors $\{a_j, j \neq i\}$, it follows that $e_i$ is orthogonal to all direction vectors, except $a_i$. Assuming for now that the sources are uncorrelated, i.e., $$S=\text{diag}[\sigma_1^2, \ldots, \sigma_d^2]; \quad (23)$$

multiplying $C_{xx}$ by $e_i$ yields the desired result:

$$C_{xx}e_i=AS[0, \ldots, 0, a_i^*e_i, 0, \ldots, 0]^T=a_i(\sigma_i^2 a_i^* e_i)=\text{scalar} \times a_i. \quad (24)$$

The result can be normalized to make the response at sensor 1 equal to unity, yielding:

$$a_i = \frac{C_{xx}e_i}{u^T C_{xx} e_i}, \quad (25)$$

where $u=[1, 0, 0, \ldots, 0]^T$.

Estimation of Source Powers

Assuming that the estimated array response vectors have been normalized as described above (i.e., unity response at sensor 1), the source powers follow from (24):

$$\sigma_i^2 = \frac{|u^T C_{xx} e_i|^2}{e_i^* C_{xx} e_i}. \quad (26)$$

Note that these estimate are only valid if sensor 1 is omni-directional, i.e., has the same response to a given source in all directions. If this is not the case, the estimates will be in error.

Estimation of Array Geometry

The array geometry can now be found from $\{a_i\}$ by solving a set of linear equations. The minimum number of direction vectors needed is equal to the number of degrees of freedom in the sensor geometry. If more vectors are available, a least squares fit can be used. Note that multiple experiments are required in order to solve for the array geometry, since for each dimension in space about which array geometric information is required, m direction vectors are required. However, in order to obtain estimates of the direction vectors, no more than $m-1$ sources can be present during any one experiment. Thus the need for multiple experiments is manifest.

Signal Copy (SC)

Signal copy refers to the weighted combination of the sensor measurements such that the output contains the desired signal while completely rejecting the other $d-1$ signals. From (22), $e_i$ is orthogonal to all wavefront direction vectors except the $i^{th}$ wavefront, and is therefore the desired weight vector for signal copy of the $i^{th}$ signal. Note that this is true even for correlated signals. If a unit response to the desired source is required, once again the assumption of a unit response at sensor 1 to this source becomes necessary. The weight vector is now a scaled version of $e_i$ and using the constraint $a_i^* \cdot w_i^{SC} = 1$ can be shown to be $$w_i^{SC} = e_i \left( \frac{|u^T C_{xx} e_i|}{e_i^* C_{xx} e_i} \right). \tag{27}$$

In the presence of correlated signals as often arises in situations where multipath is present, it is useful to combine the information in the various wavefronts (paths). This leads to a maximum likelihood (ML) beamformer which is given by:

$$w_i^{ML} = R_{xx}^{-1} C_{xx} e_i. \tag{28}$$

In the absence of noise, $R_{xx} = C_{xx}$ and $w_i^{ML} = w_i^{SC}$. Similarly, optimum weight vectors for other types of beamformers can be determined.

Some Generalizations of the Measurement Model

Though the previous discussions have been restricted to specific models for the sensors elements and noise characteristics, ESPRIT can be generalized in a straightforward manner to handle a larger class of problems. In this section, more general models for the element, signal, and noise characteristics are discussed.

Correlated Noise

In the case when the additive noise is correlated (i.e., no longer equal to $\sigma^2 I$), modifications are necessary. If the noise auto- and cross-covariances for the X and Y subarrays are known to within a scalar, a solution to the problem is available. Let $Q_{xx}$ and $Q_{xy}$ be the normalized auto- and cross-covariance matrices of the additive noise at the subarrays X and Y. Then, $$ASA^* = R_{xx} - \lambda_{min}^{(R_{xx}, Q_{xx})} Q_{xx}; \tag{29}$$

where $\lambda_{min}^{(R_{xx}, Q_{xx})}$ is the minimum GEV (multiplicity $m-d$) of the matrix pair $(R_{xx}, Q_{xx})$. We can also find $$AS\Phi^* A^* = R_{xy} - \lambda_{min}^{(R_{xy}, Q_{xy})} Q_{xy}, \tag{30}$$

where $\lambda_{min}^{(R_{xy}, Q_{xy})}$ is similarly defined. At this point, the algorithm proceeds as before with the GE's of the matrix pair $(ASA^*, AS\Phi^* A^*)$ yielding the desired results.

Coherent Sources

The problem formulation discussed so far assumed that no two (or more) sources were fully correlated with each other. This was essential in the development of the algorithm to this point. ESPRIT relies on the property that the values of $\gamma$ for which the pencil $(ASA^* - \gamma AS\Phi^* A^*)$ reduces in rank from $d$ to $d-1$ determine $\Phi$. This is, however, true only when $$\rho(ASA^* - \gamma AS\Phi^* A^*) = \rho(S(I - \gamma\Phi)) = \rho(I - \gamma\Phi). \tag{31}$$

That is, $\rho(I - \gamma\Phi)$ rather that $\rho(S)$ determines $\rho(ASA^* - \gamma AS\Phi^* A^*)$. This in turn is satisfied only when S is full rank, and thus excludes fully coherent sources.

ESPRIT can be generalized to handle this situation using the concept of spatial smoothing. Consider a signal environment where sources of degree two coherency (i.e., fully coherent groups contain at most two sources each) are present. Assume that the array is now made up of triplet (rather than doublets used earlier) element clusters. Let the corresponding subarrays be referred to as X, Y and Z. Assume, as before, that elements within a cluster are matched and all clusters have a identical (local) geometry. Let $\Phi_{XY}$ and $\Phi_{XZ}$ be the rotation operators with respect to subarray X for subarrays Y and Z respectively.

Defining the covariances $R_{xx}$, $R_{yy}$, $R_{zz}$, $R_{xy}$, and $R_{xz}$ in the usual manner, we note that $$C_{zz} = R_{zz} - \lambda_{min}^{zz} I = A\Phi_{XZ} S \Phi_{XZ}^* A^*, \tag{32}$$

and $$R_{xz} = AS\Phi_{XZ}^* A^*,$$

$$R_{yz} = A\Phi_{XY} S \Phi_{XZ}^* A^*. \tag{33}$$

Now consider the matrix pencil $$(C_{xx} + C_{zz}) - \gamma(R_{xy} + R_{zy}) = A(S + \Phi_{XZ} S \Phi_{XZ}^*)(I - \gamma\Phi_{XY})A^*. \tag{34}$$

It is easy to show that for a degree two coherency model, $$\rho(S + \Phi_{XZ} S \Phi_{XZ}^*) = d. \tag{35}$$

Therefore, the rank of the smoothed wavefront covariance matrix has been restored. Hence, $(I - \gamma\Phi)$ once again controls rank of the smoothed pencil in (34), and the GE's of the pair $\{C_{xx} + C_{zz}, R_{xy} + R_{zy}\}$ determine the DOA's. Further, for arbitrary degree of coherency it can be shown that the number of elements needed in a cluster is equal to the degree of coherency plus one.

Mismatched Doublets

The requirement for the doublets to be pairwise matched in gain and phase response (at least in the directions from which the wavefronts are expected) can be relaxed as shown below.

1. Uniform Mismatch—The requirement of pairwise matching of doublets can be relaxed to having the relative response of the sensors to be uniform (for any given direction) at all doublets. This relative response, however, can change with direction. Let A denote the direction matrix for subarray X. The the direction matrix for subarray Y can then be written as AG, where;

$$G = \text{diag}[g_1, \ldots, g_d], \tag{36}$$

and $\{g_i\}$ are the relative responses for the doublet sensors in the directions $\theta_i$. It is evident that the generalized eigenvalues of the matrix pair $\{C_{xx}, R_{xy}\}$ will now be $\Phi_{ii} G_{ii}$ resulting in GE's which no longer lie on the unit circle. If the relative gain response $(G_{ii})$ is real, the GE's deviate only radially from the unit circle. Since it is the argument (phase angle) of the GE's which is related to the DOA's, this radial deviation is important only in so far as the method of determining the number of signals must be altered (the number of unit circle GE's is no longer $d$). On the other hand, a relative phase response will rotate the GE's as well resulting in estimation bias that can be eliminated only if the relative phase mismatch is known. As an example of such an array of mismatched doublets, consider X and Y subarrays which are identical across each subarray but are mismatched between arrays.

2. Random Gain and Phase Errors—In practice, sensor gains and phases may not be known exactly and pairwise doublet matching may be in error violating the model assumptions in ESPRIT. However, techniques are available that exploit the underlying signal model to identify the sensor gains and phase from the sensor data. This is in effect a pseudo-calibration of the array where data from a few experiments are used to identify gain and phase error parameters. The estimates so obtained are the used to calibrate the doublets.

A Generalized SVD Approach

The details of the computations in ESPRIT presented in the previous sections have been based upon the estimation of the auto- and cross-covariances of the subarray sensor data. However, since the basic step in the algorithm requires determining the GE's of a singular matrix pair, it is preferable to avoid using covariance matrices, choosing instead to operate directly on the data. Benefits accrue not only from the resulting reduction in matrix condition numbers, but also in the potential for a recursive formulation of the solution (as opposed to the block-recursive nature of eigendecomposition of sample covariance matrices). This approach leads to a generalized singular value decomposition (GSVD) of data matrices and is briefly described below.

Let X and Y be $m \times N$ data matrices containing N simultaneous snapshots $x(t)$ and $y(t)$ respectively;

$$X = [x(t_1), x(t_2), \ldots, x(t_N)],$$

$$Y = [y(t_1), y(t_2), \ldots, y(t_N)]. \quad (37)$$

The GSVD of the matrix pair (X, Y) is given by:

$$X = U_X \Sigma_X V^*, \quad (38)$$

$$Y = U_Y \Sigma_Y V^*,$$

where $U_X$ and $U_Y$ are the $m \times m$ unitary matrices containing the left generalized singular vectors (LGSV's), $\Sigma_X$ and $\Sigma_Y$ are $m \times N$ real rectangular matrices that have zero entries everywhere except on the main diagonal (whose pairwise ratios are the generalized singular values), and V is a nonsingular matrix.

Assuming for a moment that there is no additive noise, both X and Y will be rank $d$. Now consider the pencil $$X - \gamma Y = A(I - \gamma \Phi)[s(t_1), \ldots, s(t_N)]. \quad (39)$$

Similar to previous discussions, whenever $\gamma = \Phi_{ii}$, this pencil will decrease in rank from $d$ to $d-1$. Now consider the same pencil written in terms of its GSVD:

$$X - \gamma Y = (U_X \Sigma_X - \gamma U_Y \Sigma_Y) V^*, \quad (40)$$
$$= U_X \Sigma_X (I - \gamma \Sigma_X^{-1} U_X^* U_Y \Sigma_Y) V^*.$$

This pencil will loose rank whenever $\gamma$ is an eigenvalue of $(\Sigma_X^{-1} U_X^* U_Y \Sigma_Y)$. Therefore the desired $\Phi_{ii}$ are the eigenvalues of the product $\Sigma_X^{-1} U_X^* U_Y \Sigma_Y$. However, from the underlying model in (1) and (2), it can be shown that in the absence of noise $\Sigma_X = \Sigma_Y$, in which case $\Phi_{ii}$ are also the eigenvalues of $U_X^* U_Y$.

In presence of additive white sensor noise, we can show that asymptotically (i.e., for large N) the GSVD of the data matrices converges to the GSVD obtained in the noiseless case except that $\Sigma_X$ and $\Sigma_Y$ are augmented by $\sigma^2 I$. Therefore, the LGSV matrices in the presence of noise are asymptotically equal to $U_X$ and $U_Y$ computed in the absence of noise, and the earlier result is still applicable.

To summarize, when given data instead of covariance matrices, ESPRIT can operate directly on the data by first forming the data matrices X and Y from the array measurements. Then, the two LGSV matrices $U_X$ and $U_Y$ are computed. The desired $\Phi_{ii}$ are then computed as the eigenvalues of the product $U_X^* U_Y$. Estimates for other model parameters as discussed previously can be computed in a similar manner.

What is claimed is:

1. A method of locating signal sources and estimating source parameters comprising the following steps:
   (a) providing an array of groups of signal sensor pairs, the sensors in each pair in each group being identical except for a fixed displacement which may differ from group to group, thereby defining two subarrays (X and Y) in each group,
   (b) obtaining signal measurements with the sensor array so configured,
   (c) determining from said signal measurements the auto-covariance matrix $R_{xx}$ of the X subarray in each group and the cross-covariance matrix $R_{xy}$ between the X and Y subarrays in each group,
   (d) determining the smallest eigenvalue of the covariance matrix,
   (e) subtracting said smallest eigenvalue from each element of the principal diagonal of the covariance matrix $R_{xx}$ and obtaining a difference $C_{xx}$,
   (f) determining the generalized eigenvalues of the matrix pair $(C_{xx}, R_{xy})$, and
   (g) locating the generalized eigenvalues which lie on a unit circle, the number of which corresponding to the number of sources and the locations of which corresponding to the parameter estimates.

2. The method as defined by claim 1 and further including the steps of:
   (a) varifying specific signal reception by determining array response (direction) vectors using the generalized eigenvectors, and
   (b) estimating the array geometry from the said array response vectors.

3. The method as defined in claim 1 with variations to improve numerical characteristics using generalized singular value decompositions of data matrices instead of generalized eigendecomposition of covariance matrices by:
   (a) forming data matrices X and Y from the data from the subarrays in each group,
   (b) computing the generalized singular vectors of the matrix pair (X,Y) yielding $X = U_X \Sigma_X V^*$ and $Y = U_Y \Sigma_Y V^*$,
   (c) computing the eigenvalues of $\Sigma_X^{-1} U_X^* U_Y \Sigma_Y$ and
   (d) locating those eigenvalues which lie on or near the unit circle, the number of which corresponding to the number of sources and the locations of which corresponding to the parameter estimates.

* * * * *